Patented Feb. 12, 1935

1,990,506

UNITED STATES PATENT OFFICE 1,990,506

BENZANTHRONE COMPOUNDS AND PROCESS OF PREPARING THE SAME

Henry J. Weiland, South Milwaukee, and Viktor M. Weinmayr, Milwaukee, Wis., assignors to E. I. du Pont de Nemours & Company, Wilmington, Del., a corporation of Delaware No Drawing. Application September 19, 1932, Serial No. 633,844

11 Claims. (Cl. 260—61)

This invention relates to new organic compounds, and a process of preparing the same.

It is an object of our invention to prepare novel benzanthrone derivatives having the following general formula:

wherein R stands for the monovalent residue of a benzanthrone while X stands for two atoms of chlorine or one atom of oxygen.

Our novel compounds are useful as intermediates for dyestuffs.

We prepare our novel compounds by reacting a benzanthrone, such as benzanthrone, with carbon tetrachloride in the presence of a metal halide condensing agent such as anhydrous aluminum chloride. This reaction gives the dichloro compound. Hydrolysis of the latter yields the ketone, that is, the compound wherein X stands for oxygen.

The reaction is preferably carried out in a closed vessel, under pressure, at a temperature of about 95 to 100° C. Higher or lower temperatures, however, may be used, say 90 to 180° C.

The reaction is preferably carried out in the presence of inert salts such as sodium or potassium chloride, and is continued until the pressure inside the vessel becomes constant, indicating that no further hydrochloric acid is being developed.

The immediate reaction product where aluminum chloride is used as condensing agent constitutes an addition compound of dibenzanthronyl-dichloro-methane and aluminum chloride. It may be decomposed by treatment with cold water. After filtering off the resulting aqueous solution of aluminum chloride, the dibenzanthronyl-dichloro-methane may be hydrolyzed with caustic alkali or with acid to give the corresponding dibenzanthronyl ketone.

Without limiting our invention to any particular procedure, the following example is given for the purpose of illustrating the same. Parts given are by weight.

Example 3,500 parts of dry carbon tetrachloride, 345 parts of benzanthrone, 800 parts of anhydrous aluminum chloride, 80 parts of sodium chloride and 80 parts of potassium chloride are charged into an autoclave. The vessel is closed and heated slowly to 95–100° C. As reaction sets in, the pressure rises due to development of hydrochloric acid gas. The mass is kept at this temperature with stirring for about 6 hours, or until the pressure becomes constant. The mass is now cooled, and the pressure released, preferably by absorbing the hydrochloric acid in water.

The residual mass in the autoclave contains, besides carbon tetrachloride, a complex reaction product of dibenzanthronyl-dichloro-methane and aluminum chloride. To decompose the latter, the mass is charged into 6000 parts of ice-water, while maintaining the temperature below 5° C. The resulting suspension is agitated for several hours, then settled, decanted, further agitated with water and decanted, and finally filtered, washed acid free, and dried, at low temperature. The excess carbon tetrachloride goes into the filtrate and may be recovered. The filter cake consists of crude dibenzanthronyl-dichloro-methane. It is a dark brown powder, fairly stable when dry, but slowly develops hydrochloric acid in contact with moisture. Its composition is most probably represented by the following formula:

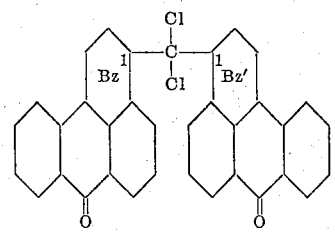

Bz1, Bz1'-dibenzanthronyl-dichloro-methane

When boiled with dilute caustic soda for 24 hours, it hydrolyzes to give dibenzanthronyl-ketone of the following probable formula:

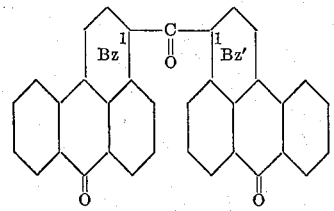

Bzl, Bzl'-dibenzanthronyl-ketone

The latter product is a fine, dark-brown powder, sparingly soluble in most organic solvents. It is soluble in concentrated sulfuric acid with a deep red color, and does not melt up to 360° C.

It is to be understood that many variations and modifications are possible in our preferred mode of procedure without departing from the spirit of this invention.

We claim:

1. Benzanthrone derivatives of the following general formula:

$$R-\underset{X}{\overset{\|}{C}}-R$$

wherein R stands for the monovalent radical of a benzanthrone, while X stands for two atoms of chlorine or one atom of oxygen.

2. A dibenzanthronyl-dichloro-methane, being substantially identical with the product obtainable by reacting benzanthrone with carbon tetrachloride in the presence of anhydrous aluminum chloride, and decomposing the reaction product in cold water.

3. A dibenzanthronyl-ketone, being substantially identical with the product obtainable by reacting benzanthrone with carbon tetrachloride in the presence of anhydrous aluminum chloride, decomposing the reaction product in cold water, and boiling the product thus obtained in caustic soda.

4. Bz1, Bz1'-dibenzanthronyl-dichloro-methane.

5. Bz1, Bz1'-dibenzanthronyl-ketone.

6. A process for manufacturing an organic compound which comprises reacting benzanthrone with carbon tetrachloride in the presence of anhydrous aluminum chloride.

7. A process for manufacturing an organic compound which comprises reacting benzanthrone with carbon tetrachloride in the presence of anhydrous aluminum chloride and decomposing the intermediate reaction product in cold water.

8. A process for manufacturing an organic compound which comprises hydrolyzing Bz1, Bz1'-dibenzanthronyl-dichloro-methane.

9. A process for manufacturing an organic compound which comprises reacting benzanthrone with carbon tetrachloride in the presence of anhydrous aluminum chloride, decomposing the intermediate reaction product in cold water and hydrolyzing the product thus obtained with the aid of caustic soda.

10. A process for manufacturing a dibenzanthronyl-methane compound which comprises heating a solution of benzanthrone in carbon tetrachloride in the presence of an excess of anhydrous aluminum chloride.

11. A process for manufacturing a dibenzanthronyl-methane compound which comprises heating a solution of benzanthrone in carbon tetrachloride in the presence of a large excess of anhydrous aluminum chloride, and continuing the reaction until no further hydrochloric acid is evolved.

VIKTOR M. WEINMAYR.
HENRY J. WEILAND.